US005635231A

United States Patent [19]

Bender et al.

[11] Patent Number: 5,635,231
[45] Date of Patent: Jun. 3, 1997

[54] PROCESS FOR TREATING RED MEAT, POULTRY OR SEAFOOD TO CONTROL BACTERIAL CONTAMINATION AND/OR GROWTH

[75] Inventors: Fredric G. Bender, McMurray, Pa.; Walter Frees, Allendale, N.J.

[73] Assignee: Rhone-Poulenc Inc., Cranbury, N.J.

[21] Appl. No.: 618,635

[22] Filed: Mar. 19, 1996

[51] Int. Cl.⁶ .......................... A23B 4/027; A23L 1/314; A23L 1/315; A23L 1/325
[52] U.S. Cl. .......................... 426/332; 426/335; 426/511; 426/532; 426/641; 426/643; 426/644
[58] Field of Search .............................. 426/332, 335, 426/532, 644, 652, 511, 521, 643, 641

[56] References Cited

U.S. PATENT DOCUMENTS

| | | | |
|---|---|---|---|
| Re. 30,023 | 6/1979 | Hawley et al. | 426/266 |
| 1,774,310 | 8/1930 | Bates . | |
| 2,770,548 | 11/1956 | Hall et al. . | |
| 2,957,770 | 10/1960 | Freund et al. . | |
| 3,493,392 | 2/1970 | Swartz . | |
| 3,615,686 | 10/1971 | England . | |
| 3,620,767 | 11/1971 | Swartz . | |
| 3,681,091 | 8/1972 | Kohl et al. . | |
| 3,705,040 | 12/1972 | Bynagte . | |
| 3,726,962 | 4/1973 | Vanstrom et al. | 423/306 |
| 3,775,543 | 11/1973 | Zyss . | |
| 3,782,975 | 1/1974 | Zyss | 426/281 |
| 3,989,851 | 11/1976 | Hawley et al. | 426/266 |
| 4,071,635 | 1/1978 | Lindl et al. | 426/646 |
| 4,075,357 | 2/1978 | Szczesniak et al. | 426/332 |
| 4,168,322 | 9/1979 | Buckley et al. | 426/250 |
| 4,293,578 | 10/1981 | Stone | 426/332 |
| 4,342,790 | 8/1982 | Katoh et al. | 426/332 |
| 4,382,098 | 5/1983 | Bolin et al. | 426/646 |
| 4,407,831 | 10/1983 | Swartz | 426/281 |
| 4,431,679 | 2/1984 | Crawford | 426/332 |
| 4,517,208 | 5/1985 | Crawford | 426/332 |
| 4,592,892 | 6/1986 | Ueno et al. | 422/28 |
| 4,683,139 | 7/1987 | Cheng | 426/266 |
| 4,683,618 | 8/1987 | O'Brien . | |
| 4,770,784 | 9/1988 | Davis et al. | 210/638 |
| 4,781,934 | 11/1988 | Shimp et al. | 426/264 |
| 4,810,514 | 3/1989 | Guenther | 426/513 |
| 4,849,237 | 7/1989 | Hurst | 426/332 |
| 5,069,922 | 12/1991 | Brotsky et al. | 426/332 |
| 5,143,739 | 9/1992 | Bender et al. | 426/332 |
| 5,192,570 | 3/1993 | Bender et al. | 426/332 |
| 5,268,185 | 12/1993 | Bender et al. . | |
| 5,283,073 | 2/1994 | Bender et al. | 426/332 |
| 5,512,309 | 4/1996 | Bender et al. | 426/332 |

FOREIGN PATENT DOCUMENTS

| | | |
|---|---|---|
| 847280 | 7/1970 | Canada . |
| 935413 | 8/1963 | United Kingdom . |
| 1339503 | 12/1973 | United Kingdom . |

OTHER PUBLICATIONS

Thompson et al, "Phosphate and Heat Treatments to Control Salmonella and Reduce Spoilage and Rancidity on Broiler Carcasses", Poultry Science 1979, 58, pp. 139–143.

*Chemical Pasteurization of Poultry Meat*, Teotia, Dissertation Abstracts Int'l. B. 1974, 34(a), pp. 41–42.

Hargreaves et al, *The Antimicrobial Effect of Phosphate with Particular Reference to Food Products*, The British Food Manufacturing Industries Research Association, Scientific & Technical Surveys, No. 76, Apr. 1972, pp. 1–20.

"Effects of Type and Concentration of Phosphate and Amount of Salt and Brine on WHC, Color and Consistency of Cooked Meat Products," G. Barbieri, et al., Industria Conserve 1989, 64:313.

"The Influence of Scald Water pH on the Death Rates of *Salmonella typhimurium* and Other Bacteria Attached to Chicken Skin," T.J. Humphrey, et al., Journal of Applied Bacteriology 1984, 57(2), pp. 355–359.

"The Effect on pH Adjustment on the Microbiology of Chicken Scald–tank Water with Particular Reference to the Death Rate of Salmonellae," T.J. Humphrey, et al., Journal of Applied Bacteriology 1981, 51, pp. 517–527.

Grant, Hackh's Chemical Dictionary, 4th edition, McGraw Hill Company, New York, 1969, p. 514.

*Bacteriolytic Action of Phosphates*, G. Pacheco, et al., Mems Institute Oswaldo Cruz, 52(2), pp. 405–414.

"Chemicals Used in Food Products," National Academy of Sciences, National Research Counsel, Publication 1274 (1965).

*Primary Examiner*—Arthur L. Corbin
*Attorney, Agent, or Firm*—Andrew M. Solomon

[57] ABSTRACT

A process for treating poultry, red meat or seafood comprising the step of contacting the poultry, red meat or seafood with:

(1) a treatment solution comprising trialkali metal orthophosphate; and (2) steam for a time period effective to remove, reduce or retard bacterial contamination without significantly depreciating the organoleptic properties of the animal and/or seafood is provided.

13 Claims, No Drawings

PROCESS FOR TREATING RED MEAT, POULTRY OR SEAFOOD TO CONTROL BACTERIAL CONTAMINATION AND/OR GROWTH

BACKGROUND OF THE INVENTION

1. Field of the Invention

The present invention relates to an improved process for reducing the level of and retarding the growth of bacteria, on newly slaughtered raw red meat carcasses, poultry carcasses or seafood without causing organoleptic depreciation thereof. The process selected is the combination of steam and a trialkali metal orthophosphate solution.

2. Technology Description

The applicants' assignee has obtained a number of United States patents directed to the use of aqueous solutions of trialkali metal orthophosphate, preferably trisodium orthophosphate, to treat red meat, poultry and seafood. These include the following: 5,069,022; 5,143,739; 5,192,570; 5,262,186; 5,268,185; 5,283,073; and 5,354,568. Each of these patents is characterized by including a treatment step wherein at least a four percent aqueous solution of trialkali metal orthophosphate is used.

The combination of hot water with phosphates as a way to reduce bacterial contamination of poultry has been reported in Thomson et al., "Phosphate and Heat Treatments to Control Salmonella and Reduce Spoilage and Rancidity on Broiler Carcasses", Poultry Science 58:139–143 (1979). The phosphates used in the evaluation are sodium tripolyphosphate and sodium hexametaphosphate.

The use of hot scald water having a pH of about 9 to reduce contamination of poultry has been reported in Humphrey et al., "The Effect of pH Adjustment on the Microbiology of Chicken Scald-tank Water with Particular Reference to the Death Rate of Salmonellas", Journal of Applied Bacteriology, 51:517–527 (1981). The basic chemicals used to adjust samples of the scalding water to a pH of about 8.8 were sodium and potassium hydroxide, sodium carbonates and tri-sodium phosphate.

Different methods for the pasteurization of poultry meat are discussed in Teotia, "Chemical Pasteurization of Poultry Meat", Ph.D. Thesis, Colorado State University, 1973. Various treatments are described in the thesis including the testing of sodium carbonate, sodium borate or potassium hydroxide solutions at elevated temperatures and testing involving the use of only hot water.

It would be desirable to achieve effective bacterial reduction while potentially reducing the amount of trialkali metal orthophosphate used and by using a treatment means in addition to the trialkali metal orthophosphate treatment. In accordance with this invention it is possible to achieve this result by utilizing the combination of steam with a trialkali metal orthophosphate solution.

SUMMARY OF THE PRESENT INVENTION

In accordance with the present invention, there is provided a process for treating red meat carcasses (including parts and organs), poultry carcasses (including parts and organs) and seafood to remove, reduce or retard bacterial growth, such as salmonella, campylobacter, *E. coil*, and spoilage bacteria, without significantly affecting the organoleptic properties of the carcass. The process comprises surface treating the red meat carcasses, poultry carcasses or seafood with a combination of steam and trialkali orthophosphate, preferably above pH 11.5, without significantly changing the color of the surface being treated resulting from high pH or the steam treatment.

The use of the term 'carcass' as used in this application expressly includes the above defined external and internal parts and organs of the red meat, poultry or seafood.

More particularly, the treatment comprises the application, preferably simultaneous, of steam and the trialkali metal orthophosphate solution. The concentration of trialkali metal orthophosphate in the solution ranges from about 0.1 percent to saturation. In preferred embodiments, the temperature of the steam is about 100° C. to about 116° C. and at a pressure of about 10 psig to about 10 psig. All pressure and temperature measurements are at sea level. Alternatively, the steam and treatment solution steps may be applied sequentially.

The process is preferably conducted by spraying the steam and orthophosphate solution onto all surfaces of the carcass for one second to 8 seconds. In the case of red meat, preferably treatment is done before rigor on set. In the case of poultry, treatment is preferably done before chilling.

Specifically, it has been discovered that carcasses can be treated with steam and from about 0.1% to saturation of a aqueous solution of trisodium or tripotassium orthophosphate dodecahydrate or an equivalent amount of the anhydrous compound.

By use of this process the carcasses can be treated economically and simply with a food grade product to achieve salmonella and other bacteria control without organoleptic depreciation of the carcass and organs and can take advantage of the sterilizing effect that the steam treatment may afford.

An object of the present invention is to provide a method for reducing bacteria on red meat, seafood and poultry carcasses.

Still another object of the present invention is to provide a method for reducing bacteria on red meat, seafood and poultry carcasses which utilizes minimal amounts of treatment solutions.

A further object of the present invention is to provide a method for reducing bacteria on red meat, seafood and poultry carcasses which utilizes the combined effects from a treatment solution and steam.

These, and other objects, will readily be apparent to those skilled in the art as reference is made to the detailed description of the preferred embodiment.

DETAILED DESCRIPTION OF THE PREFERRED EMBODIMENT

In describing the preferred embodiment, certain terminology will be utilized for the sake of clarity. Such terminology is intended to encompass the recited embodiment, as well as all technical equivalents which operate in a similar manner for a similar purpose to achieve a similar result.

The present invention involves using two types of treatment to reduce bacterial contamination of an animal carcass. The two types of treatment are: (1) treatment with a trialkali metal orthophosphate solution; and (2) treatment with steam.

The invention is applicable to any red meat including pork, beef, veal, mutton, lamb and goat, either whole carcass or fresh parts, including internal organs such as hearts, kidneys and livers, preferably before rigor. This invention is further applicable to any poultry carcass or fresh parts, including internal organs such as hearts, kidneys and livers, including but not limited to chicken, turkey, hen, squab, duck, quail, and the like, or any type of seafood including but not limited to shellfish, fresh water fish, and sea (salt) water fish in either whole, eviscerated or filleted condition.

The carcass surface and/or organs is treated with a trialkali metal orthophosphate solution and steam either before, during or after chilling. Application of the steam and trialkali metal orthophosphate may occur sequentially or simultaneously, with a simultaneous application being particularly preferred.

The first type of treatment is the use of a trialkali metal orthophosphate aqueous solution. Trialkali metal phosphate is an orthophosphate salt of the formula $R_3PO_4$ with a formula for the sodium salt being $Na_3PO_4$ and an equivalent formula for the tripotassium compounds. R is an alkali metal of sodium or potassium. Trisodium phosphate has a minimum of 41.5% $P_2O_5$ and a typical pH in a 1% solution of about 11.8.

Trisodium phosphate is available as the dodecahydrate and in commerce the dodecahydrate is available in technical or food grade. Preferably the dodecahydrate (either form) is used. As used herein trisodium phosphate is intended to include tripotassium phosphate as well as all forms of those compounds.

The carcass is treated with a solution containing from about 0.10% to saturation, preferably from about 0.5% and more preferably from about 1% to saturation of trialkali metal orthophosphate by weight. From about 0.25% to 20%, preferably 0.5–15%, and most preferably from about 1.0% to 12% (including 1, 2, 4, 6, 8, 10 and 12 percent solutions) of trialkali metal orthophosphate can be effective.

The treatment solution may also include a minor amount of other alkaline materials such as carbonates and hydroxides. Specific examples include sodium hydroxide, potassium hydroxide, sodium carbonate, potassium carbonate, sodium tripolyphosphate and mixtures thereof. The term 'a minor amount' defines less than 50% by weight of the combined dry weight of the trialkali metal orthophosphate and the alkaline material usually, and in all cases in an amount insufficient to cause organoleptic deterioration.

The carcass can be dipped in the treatment solution preferably with solution agitation to increase contact of the treatment solution with all surfaces and crevices of the carcass, including the internal organs. The treatment solution is preferably applied by mechanical sprayers, usually under high pressure to insure good contact of the treatment solution with the surface. The treatment solution preferably contains only trialkali metal orthophosphate as the means to control, reduce, retard or remove bacteria. No alcohol, nitrate or nitrite, or ascorbic acid is employed in the treatment solution for purposes of enhancing the effect of the orthophosphate. The treatment solution may contain other ingredients for water binding, cleaning, flavoring, coloring and the like. Salts may be used, including chlorides and the like. Normally, except in pumping solutions, other phosphates are not combined with the orthophosphate.

In the case of treating poultry carcasses it is preferred to employ the trialkali orthophosphate treatment immediately after the scalding treatment either before or after defeathering or during washing of the poultry prior to evisceration or preferably during the inside/outside wash after evisceration. These treatments are conducted using a warm or hot solution and recycling the solution with filtering to economically utilize the phosphate.

In the case of treating red meat it is preferably treated with the trialkali metal orthophosphate either before or directly after skinning and usually prior to chilling. In particularly preferred embodiments, the treatment is performed pre rigor.

In the case of seafood the treatment with the trialkali metal orthophosphate can occur at any stage of processing, such as during shell, skeleton, head, viscera, scale or skin removal or prior to, during or after freezing, refrigeration, icing, ice glazing, cooking or pasteurization. Preferably the seafood is treated either just after catch on the fishing boat or shortly after arrival at the processing plant prior to cooking or packaging. It is particularly preferred to use the treatment solution after evisceration and during washing or after washing the flesh.

The treatment solution preferably comprised of trialkali metal orthophosphate is in an amount sufficient to provide a pH above about 11.5 and preferably within a range from 11.6 to 13.5 and most preferably from about pH 12 to pH 13.5.

At atmospheric pressure, in a dip tank, dwell times from 5 seconds to about 30 minutes are effective, while dwell times using a spray range from several seconds to several minutes or 2 seconds to 15 minutes with spray times of less than 30 seconds preferred.

The high pH of over 11.5, preferably about pH 12 or above is critical to remove, reduce or retard bacterial contamination or growth. The mechanism is not entirely understood, but the orthophosphate appears to improve bacterial removal as well as retarding growth of any residual bacteria.

The second treatment step comprises the use of steam. More particularly, the carcass to be treated is contacted with steam at a temperature of about 100° C. to about 116° C., more preferably at a temperature of about 100° C. to about 110° C., most preferably at a temperature of about 107° C. to about 110° C., and at a pressure of about 0 psig to about 10 psig, more preferably at a pressure of about 0 psig to about 5 psig, most preferably at a pressure of about 0 psig to about 1 psig. All pressure and temperature measurements are at sea level.

The time for treatment typically ranges from about 1 sec. to about 20 sec., more preferably from about 1 sec. to about 8 sec. and most preferably from about 1 sec. to about 3 sec. When the steam treatment is simultaneous with the trialkali metal orthophosphate treatment, the treatment time would be the same for both types of treatment. A particular concern is that the treatment time be short enough so that the organoleptic properties of the treated surface are not significantly modified.

When the treatment steps occur sequentially, the steam application step may either precede or follow the trialkali metal orthophosphate treatment step.

In a particularly preferred embodiment, the treatment solution is aspirated or injected directly into the steam.

As would be readily understood by one skilled in the art, the treatment time, solution concentration and temperature are selected such that the organoleptic properties of the animal or seafood being treated do not appreciably change. For example, when treating beef samples slight discoloring may occur, but not enough to effect the overall taste, appearance and the like.

We have found the trialkali metal orthophosphate treatment solution is effective against salmonella, campylobacter, *E. coli*, pseudomonas, bacillus, moraxella, spoilage bacteria and the like.

It is also hypothesized by the inventors that the combination of steam and a trialkali metal orthophosphate solution may increase the shelf-life of the resulting poultry, red meat or seafood. Increases of about one to about fourteen days may be achieved by utilizing the inventive method.

The invention is further described in the following non-limiting Example.

EXAMPLE

The combination of steam and trisodium orthophosphate (dodecahydrate) is used to determine the efficacy against *E. coli* 0157:h7 under several operating conditions. The samples used to test efficacy are beef goose neck rounds purchased from a grocery store which are then inoculated with *E. coli* 0157:7 strains (both clinical isolates and beef isolates) at about 70° F. The inoculated beef rounds are then subjected to the simultaneous combination of steam (102° C., 14±2 psi ) or high pressure air (ambient, 50 psi or 14 psi ) with a treatment solution (deionized water or a 12% aqueous solution of trisodium orthophosphate). Testing is done using a Fisher Scientific "Fisher Air-ejector Aspirators" (found on page 865 Fisher Catalog 95/96). Three aspirators are arranged so that they can contact one target area. A specially designed target box is designed to hold the aspirators and meat target and shutters are designed to control the target time of exposure.

The different combinations that are used are:

Sample A: Steam and 100% deionized water

Sample B: Steam and 12% trisodium orthophosphate (TSP) solution (resulting in a flow rate of TSP solution of 8.3 ml/s).

Sample C: 50 psig air and 12% trisodium orthophosphate (TSP) solution (resulting in a flow rate of TSP solution of 5.0 ml/s).

Sample D: 14 psig air and 12% trisodium orthophosphate (TSP) solution (resulting in a flow rate of TSP solution of 1.7 ml/s).

Sample E: No treatment (control)

To test the efficacy of the various treatments, surfaces of meat that have been inoculated are mounted vertically on hooks and placed in a box where the nozzles of the apparatus used for the different sample treatments are located 8 inches from the inoculated area. Samples are exposed to the different treatments for a time period of 15 seconds. Triplicate experiments are conducted. After treatment, the inoculated areas are excised and tested for remaining bacteria. The results are shown in the attached table and are reported as the number of microorganisms per square centimeter. The amount of microorganism remaining in log units is shown in parenthesis.

| Sample | Experiment 1 | Experiment 2 | Experiment 3 | Average |
|---|---|---|---|---|
| A | $9.2 \times 10^1$ (1.96) | $8.4 \times 10^0$ (0.92) | $9.2 \times 10^0$ (0.96) | $3.7 \times 10^1$ (1.57) |
| B | $<1.2 \times 10^0$ (0.08) | $3.7 \times 10^1$ (1.57) | $<1.2 \times 10^0$ (0.08) | $<1.3 \times 10^1$ (<1.11) |
| C | $4.4 \times 10^3$ (3.63) | $1.8 \times 10^3$ (3.26) | $9.6 \times 10^2$ (2.98) | $2.5 \times 10^3$ (3.38) |
| D | $>4.4 \times 10^3$ (3.64) | $>4.4 \times 10^3$ (3.64) | $4.4 \times 10^3$ (3.64) | $>4.4 \times 10^3$ (3.64) |
| E | $>4.4 \times 10^4$ (4.64) | $>4.4 \times 10^4$ (4.64) | $>4.4 \times 10^4$ (4.64) | $>4.4 \times 10^4$ (4.64) |

The above experiment is repeated using the following treatment methods with the only difference being the reduction of the treatment time to 8 seconds.

Sample F: Steam (approx. 14 psig)

Sample G: Steam (approx. 14 psig) and 12% trisodium orthophosphate (TSP) solution (resulting in a flow rate of TSP solution of 10.0 ml/s).

Sample H: No treatment (control)

| Sample | Experiment 1 | Experiment 2 | Experiment 3 | Average |
|---|---|---|---|---|
| F | $6.0 \times 10^1$ | $1.8 \times 10^3$ | $9.6 \times 10^2$ | $9.4 \times 10^2$ (2.97) |
| G | $1.7 \times 10^1$ | $9.2 \times 10^0$ | $1.7 \times 10^2$ | $6.5 \times 10^1$ (1.81) |
| H | $9.6 \times 10^3$ | $1.8 \times 10^4$ | $1.8 \times 10^4$ | $1.5 \times 10^4$ (4.18) |

The above data demonstrates that the combination of steam and trialkali metal orthophosphate is effective to significantly reduce bacterial contamination. More specifically, while both the use of steam and trisodium orthophosphate, alone, will function to reduce the remaining bacteria on the surface, the combined effects of the two treatments yield results which approach multiple (i.e., greater than 3) log reductions, thereby reducing the final bacterial contamination by at least 99 percent, and typically by at least 99.9 percent. This affords the food processor with the opportunity to provide an extremely safe product to the ultimate consumer.

Having described the invention in detail and by reference to the preferred embodiments thereof, it will be apparent that modifications and variations are possible without departing from the scope of the appended claims.

What is claimed is:

1. A process for treating poultry, red meat or seafood comprising the step of contacting the poultry, red meat or seafood with:

(1) a treatment solution comprising trialkali metal orthophosphate; and (2) steam for a time period effective to remove, reduce or retard bacterial contamination without significantly modifying the organoleptic properties of the poultry, red meat or seafood.

2. The process according to claim 1 wherein the concentration of trialkali metal orthophosphate in said solution is from about 0.1 percent by weight to saturation.

3. The process according to claim 2 wherein the concentration of trialkali metal orthophosphate in said solution is from about 4.0 percent by weight to about 20.0 percent by weight.

4. The process according to claim 1 wherein said trialkali metal orthophosphate comprises trisodium orthophosphate.

5. The process according to claim 1 wherein the pH of said treatment solution is greater than about 11.5.

6. The process according to claim 5 wherein the pH of said treatment solution is between about 12 and about 13.5.

7. The process according to claim 1 wherein said treatment solution does not contain alcohol.

8. The process according to claim 1 wherein said poultry, red meat or seafood comprises a poultry carcass and wherein said treatment solution is applied prior to chilling said carcass.

9. The process according to claim 1 wherein said poultry, red meat or seafood comprises red meat and wherein said treatment solution is applied prior to rigor.

10. The process according to claim 1 wherein said poultry, red meat or seafood comprises seafood and wherein said treatment solution is applied after evisceration.

11. The process according to claim 1 wherein said treatment solution and said steam are applied simultaneously.

12. The process according to claim 11 wherein said treatment solution and said steam are applied to said poultry, red meat or seafood for between about 1 and about 20 seconds.

13. The process according to claim 1 wherein said steam is applied at a temperature of about 100° C. to about 116° C. and at a pressure of about ambient to about 10 psig.

* * * * *